Dec. 10, 1968    R. L. IGNELL    3,414,941
APPARATUS FOR PRESS FORMING A CONTAINER STRUCTURE FROM PLASTIC
SHEET MATERIAL AND CONTAINER STRUCTURE MADE THEREBY
Filed Nov. 10, 1966    3 Sheets-Sheet 1

INVENTOR
Rolf Lennart Ignell

BY *Pierce, Scheffler & Parker*
ATTORNEYS

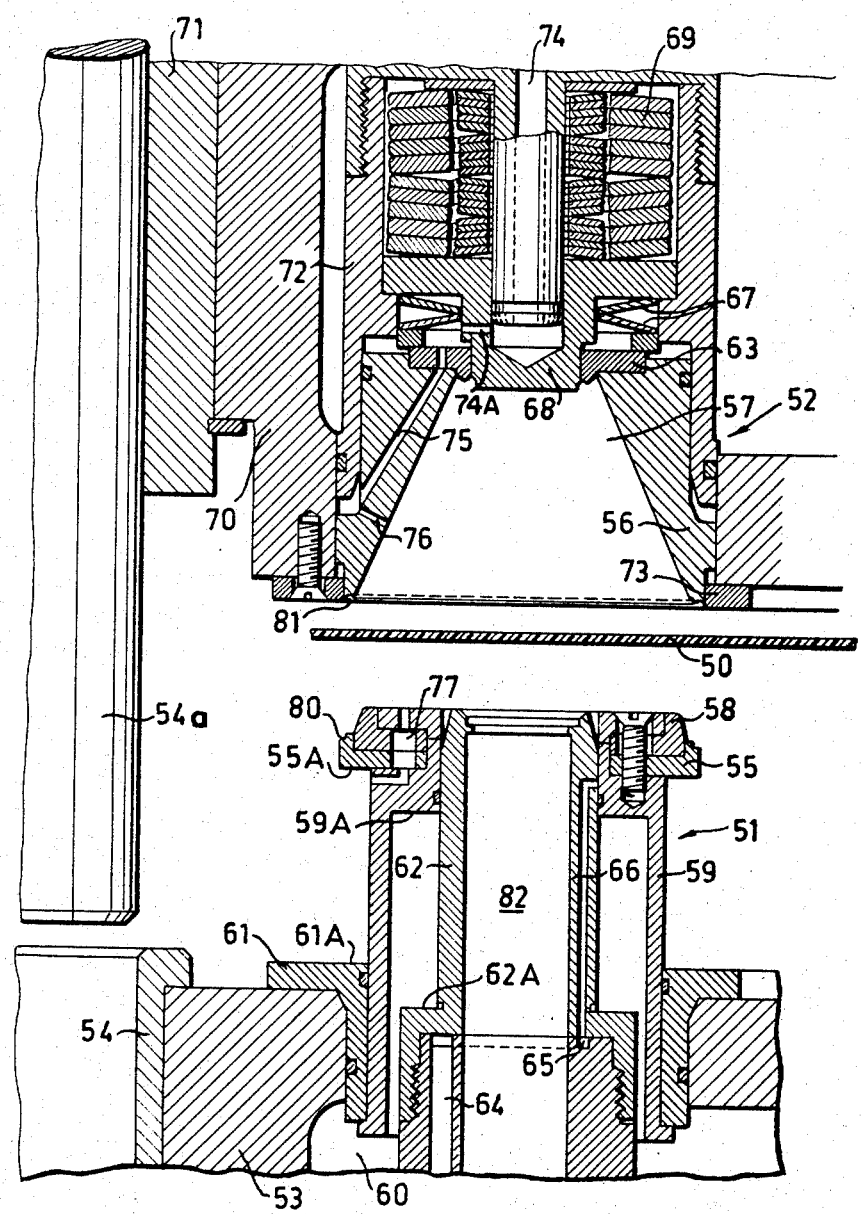

United States Patent Office 3,414,94[1]
Patented Dec. 10, 196[8]

3,414,941
APPARATUS FOR PRESS FORMING A CONTAINER STRUCTURE FROM PLASTIC SHEET MATERIAL AND CONTAINER STRUCTURE MADE THEREBY
Rolf Lennart Ignell, Lund, Sweden, assignor to Sobrefina SA, Fribourg, Switzerland, a Swiss company
Filed Nov. 10, 1966, Ser. No. 593,341
Claims priority, application Sweden, Feb. 4, 1966, 1,439/66
4 Claims. (Cl. 18—19)

ABSTRACT OF THE DISCLOSURE

A press for forming plastic sheet material into a container structure comprises a hollow forming die in the form of a conical frustum into which is pressed plastic sheet material to be formed into a container structure having a corresponding frusto-conical configuration. A pair of concentric die members effect the necessary pressing-in of the plastic material, one die member being used to form a flange at the lower, larger diametered part of the container frustum, and another, smaller die member being used to form the upper, smaller end of the container frustum and simultaneously establish a pouring mouth at this end which is provided with an inturned lip having a highly polished surface to receive a closure plug. Compressed air discharged through an opening in a side wall of the smaller die member serves to press the sheet plastic into contact with the wall of the hollow frusto-conical die member.

---

Figure 1:
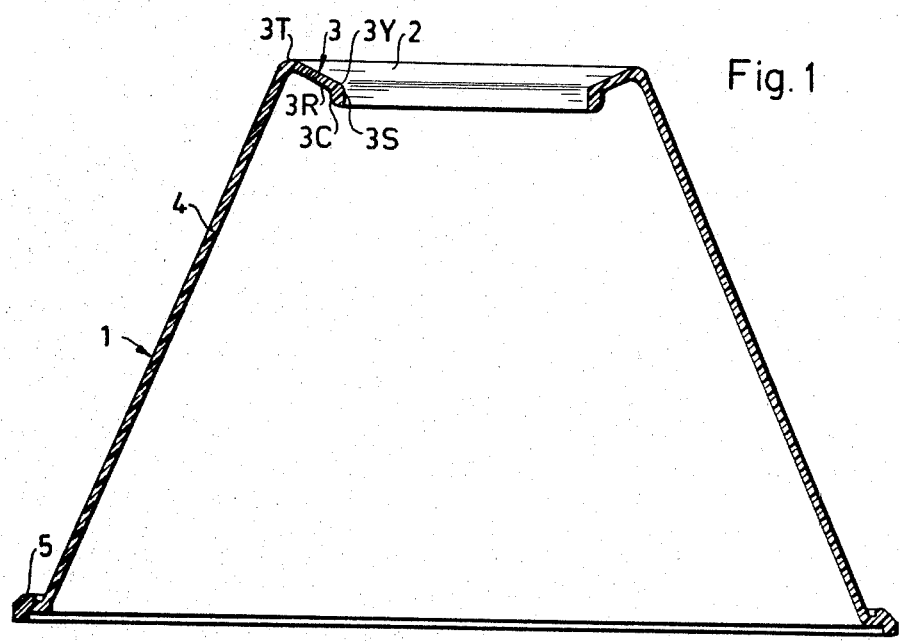

The present invention relates to apparatus for pressforming a container structure from plastic sheet material and to an improved container structure made thereby and has been developed in conjunction with the production of a new container intended especially for packaging aerated drinks, and in which heavy demands are placed on the physical properties and sealability of the container, which properties are to be combined with small consumption of material and ease of closure. At the same time as the container is to have a substantial wall thickness in regions where the mechanical stresses are particularly high, such as the region around the mouth of the container and in a sealing region, where the walls are to present a relatively complicated sectional outline, and in which region two parts are intended to be welded together to form the complete container. The container is to have a wall thickness as small as possible in other regions, in order to enable the consumption of material to be reduced. In addition, heavy demands are placed on the mouth of the container, the inner periphery of which must be completely smooth, in order to allow a cap driven down into the aperture effectively to close the container. Moreover, the forming of the parts of the container is to take place quickly, by which is meant part of a second, which is attained by a special forming technique.

As a starting material for the container one has utilized a flat, preferably web-shaped plastic material. One has previously proposed a method of plasticizing the plastic material in a manner well adapted to this purpose. According to this method that plastic portion which is intended to form a container part is plasticized in a number of sequential stations. By the fact that according to a special procedure more heat is supplied to certain regions of the said portion, as for instance to that region which is to define the area around the container mouth, one will obtain a material which is very well adapted to th[e] method according to the present invention. The metho[d] according to the present invention can therefore be co[n] sidered to constitute a continuation of this previously pr[e] posed procedure, and concerns therewith the actual fin[al] forming of the area around the mouth of the containe[r] part, and how this can be co-ordinated with the separatio[n] of the formed container part from the basic material.

It has also been proposed to provide a cap having [a] tubular plug portion intended to be inserted in a co[n] tainer mouth which has an inwardly turned lip portio[n]. On the tubular plug portion there is a sealing ring in[-] tended to form a seal against a sealing surface of the in[-] turned lip. In order for the action of the sealing ring t[o] be satisfactory, it is of vital importance that the ring [is] not damaged when capping. In previously suggested co[n-] tainer designs this problem has not been able to be solve[d] satisfactorily due to the difficulties in performing th[e] punching of the mouth and the final forming of the li[p] in a rational manner. A foremost object of the prese[nt] invention is therefore to punch out the mouth and for[m] the inturned lip in such a manner that the cap intende[d] for the container, and primarily the sealing element o[f] the cap, is not damaged when capping.

The invention is characterized in that the plastic m[a] terial in a plasticized state is clamped between first an[d] second forming elements, said second element exhibitin[g] a duct or depression defining the size of the mouth, where[by] upon a die with a front face that has a size which corre[-] sponds with the size of the orifice of the duct or depressio[n] is displaced relative to the said first forming element i[n] a direction towards the clamped plastic material at leas[t] until the front edge comes into contact with the sai[d] second forming element, whereby the plastic material i[s] punched right through, besides which a polished part o[f] the front surface of the die adjacent to the front edge o[f] said die thereby press moulds the plasticized plastic ma[-] terial nearest the mouth to obtain a surface with a hig[h] degree of surface finish.

Figure 3:
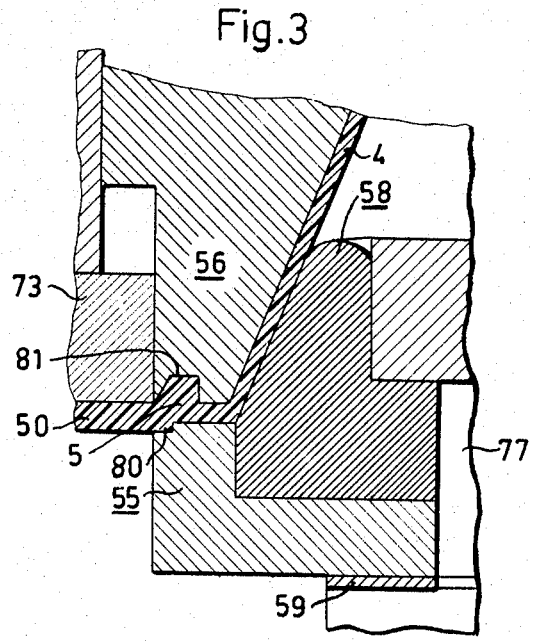
Figure 4:
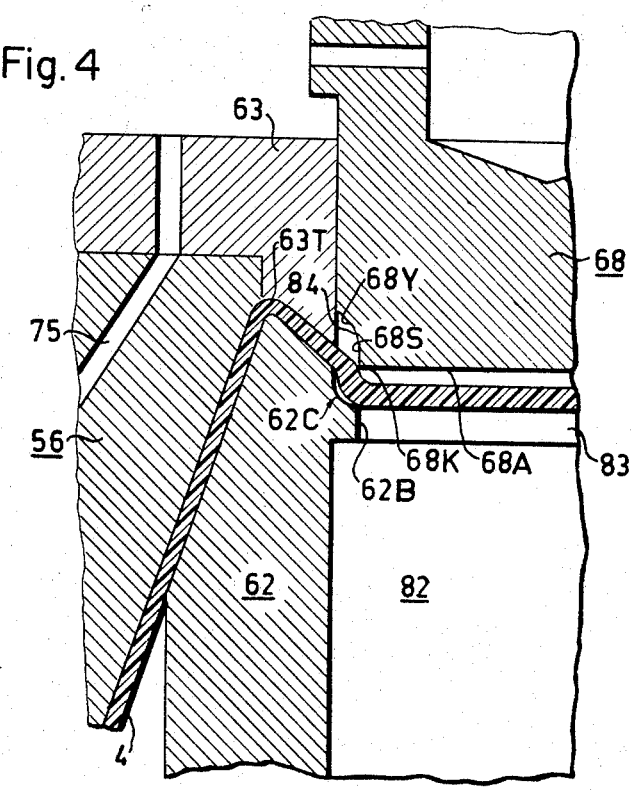
Figure 5:
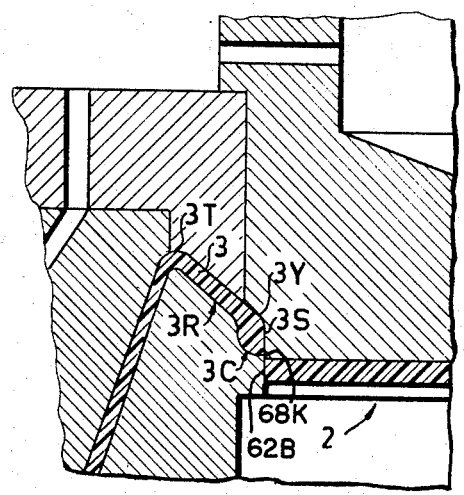

Further characteristics and advantages of the inventio[n] will be apparent from the description that follows, i[n] which reference is made to the accompanying drawing[s] of which FIG. 1 shows an enlarged section through a containe[r] part produced by utilizing the principles of the invention FIG. 2 shows a tool intended to be used for the in[-] vention, FIG. 3 illustrates to an enlarged scale the shaping o[f] a flange, and how the formed container part is intende[d] to be separated from the basic material, FIG. 4 shows the initial position for the punching o[f] the mouth and for the final forming of the inturne[d] lip, and FIG. 5 illustrates the final position of the final form[-] ing in the area for the mouth.

IN FIG. 1 the numeral 1 represents the top part of [a] plastic bottle and which includes a mouth 2 intended t[o] form an emptying aperture in the finished container, an[d] which is reinforced by an inturned lip 3. The containe[r] part 1 also includes a neck part 4 and a lower flange 5 which is intended to be welded on to a bottom part of th[e] container. The mouth 2 is intended to be closed by the ca[p] of the kind previously described or with the cap of [a] similar kind, which is provided with special sealing mem[-] bers, such as sealing rings, sealing tongues or the like.

As the container is intended to be used principally fo[r]

liquid materials, which develop an internal pressure in the container, it is necessary for the lip 3 to be relatively strongly constructed to withstand the stresses that will occur. This applies both to the relatively straight part 3R of lip 3, which exhibits a more substantial wall thickness than the neck part 4, and to the transition 3T between neck and lip, and above all to the innermost part 3C of the lip, against which special sealing elements on the cap referred to above will press. In addition the surface 3S of lip 3 turned towards the axis of the container must be very smooth in order that the necessary sealing can be obtained, besides which the transition 3Y between the straight part 3R and the face 3S of lip 3 must be made very smooth to prevent the cap from being damaged when capping.

Even the flange 5 is formed in a special manner, which is dependent on the fact that the flange is to be able to be durably welded on to a bottom part of the container not shown in the figures. The different components, i.e. beads, grooves etc. from which flange 5 is formed should not need to be described in more detail as regards their function or construction, but reference is made to FIG. 1, which depict this part plainly.

FIG. 2 shows a forming tool for producing the part illustrated in FIG. 1 in the design that the tool is considered to have in a commercial machine. Here 50 designates a plasticized plastic material that has been fed in between a mandrel 51 and a mould 52. The mandrel 51 is arranged to slide in a machine part 53, which also supports a guide bush 54 that acts together with a locating pin 54a. In the depicted machine, the part 53 is arranged to slide up towards the mould 52. By this means the material 50 will be squeezed between a forming die in the shape of ring 55 and the front edge of a frusto-conical forming die 56 forming a cavity within which is to be moulded by press forming a container structure having a frusto-conical configuration. Flange 5 is thereby formed, as shown on an enlarged scale in FIG. 3, with the aid of forming faces 80 and 81. At the same time a certain drawing-in of material 50 into the cavity 57 will take place with the aid of a drawing and clamping ring 58. After the material 50 has been clamped, the rings 55 and 58 and the sleeve 59, on which these rings are fastened, are pressed into machine part 53 against the action of a hydraulic pressure acting in the inner space 60. The sleeve 59 slides between an annular bush 61 secured in the machine part 53 and a tubular press tool or clamp arbor also secured in the machine part 53, and the inner duct of which has been designated 82. This press tool or die 62 which is disposed concentrically within the outer die part 55 used to form the flange at the larger end of the container wall structure, presses the material 50 up into contact with the tapered sleeve or forming die 56 and a forming ring 63 secured to this. Forming is facilitated suitably by the use of compressed air. This air pressure is produced by connecting a duct 64 with a source of compressed air. The air pressure in the duct 64 is then conducted through an annular groove 65 and a further groove 66, which, in the protruding position of the mandrel 62, is connected to the cavity 57.

77 designates a blow hole.

When the shaped material has been made closely to follow the walls of cavity 57, the forming pressure is further increased by bringing faces 59A and 62A in contact with each other. A compression of cup springs 67 will then take place, whilst tool 56 and ring 63, rings 55 and 58 are all pressed upwards in the figure.

FIGS. 4 and 5 also show in more detail how the elements that are to form the mouth and the material around the mouth are designed. The tubular press tool 62 presents an upper portion that is shaped to define the special form of the bottle top and the inturned lip 3. Thus the press tool 62 exhibits a grooved recess 62C, which is intended to define one side of the inner part 3C of the lip 3. The size of the orifice 83 of the tubular press tool 62, together with the bottom face 68A of the combined die and punch 68, determines the size of the container mouth. In FIG. 4 the wall of the orifice has been given the designation 62B.

The outside of the top of the container is shaped partly by the mould 56 and partly by the forming ring 63, at which the transition 3T is formed by the face 63T of ring 63.

The surface 3S and transition 3Y that are so important for the closure of the container are shaped and glazed with the aid of the polished faces 68S and 68Y of the punch 68, which define a grooved recess 84.

When the forming ring 55, the clamping ring 58, the forming tool 56, the forming ring 63 and the press tool 62 are brought upwards relative to the stationary cutting ring 73 and the punch 68 under the compression of the cup springs 67, a separation of the shaped part from the basic material will take place simultaneously, FIG. 3, and a forming of the inturned lip, FIG. 4. The forming is finished by the completion of the punching-out of the mouth 2, which occurs when the edge 68K of the punch 68 comes into contact with the top limiting edge of face 62B as shown in FIG. 5. The punched-out disk is removed through the duct 82.

If the forming pressure should increase above the normal, e.g. if a double charge of material should be fed into the cavity 57, the spring assembly 69 shown in FIG. 2 is compressed. 70 designates a machine part that supports several tools 52. The details shown with machine part 70 include the following, namely a bush 71, a locating pin 54a, a punch 68 and a guide bush 72. FIG. 2 shows also air ducts 74A, 75, 76, through which the cavity 57 can be connected to a source of vacuum to facilitate forming, and can be connected to a source of compressed air for ejection of the finished object.

I claim:

1. Apparatus for press forming plastic sheet material into a container wall structure comprising an essentially stationary hollow forming die having a frusto-conical configuration, a circular punch projecting into the smaller end of said frusto-conical forming die, a pair of cylindrical concentric inner and outer annular mating dies mounted for independent movement towards and away from said frusto-conical forming die, means for introducing said sheet material between said frusto-conical forming die and said concentric mating dies, said outer mating die being cooperative with the larger end of said frusto-conical forming die to press form therebetween a flange on said blank, said inner mating die being cooperative with the smaller end of said frusto-conical forming die to press form the appertaining portion of said sheet material into an inturned lip and also being cooperative with said punch to cut out a mouth adjacent said lip, the periphery of said punch adjacent the cutting edge thereof being a polished surface and cooperative with a corresponding surface on said inner mating die to shape and glaze a corresponding surface at the inner edge of said inturned lip which establishes the periphery of said mouth.

2. Apparatus as defined in claim 1 wherein the periphery of said punch is curved to establish a smooth transition on the lip leading to said glazed surface.

3. Apparatus as defined in claim 1 wherein said surface on said inner mating die which cooperates with said polished surface on the periphery of said punch is constituted by a grooved recess which serves to establish a reinforcement for the inner part of said lip.

4. Apparatus as defined in claim 1 wherein the periphery of said punch is curved to establish a smooth transition on the lip leading to said glazed surface and wherein said inner die which cooperates with the polished surface on the periphery of said punch is constituted by a grooved recess which serves to establish a reinforcement for the inner part of said lip.

(References on following page)

References Cited

UNITED STATES PATENTS

| | | | |
|---|---|---|---|
| 1,253,316 | 1/1918 | Weiland | 18—19 |
| 1,482,732 | 2/1924 | Calleson. | |
| 1,849,669 | 3/1932 | Glasner et al. | |
| 1,856,319 | 5/1932 | Cooper | 18—19 |
| 1,858,225 | 5/1932 | Frederick | 18—19 |
| 1,972,789 | 9/1934 | Newkirk | 18—19 X |
| 1,879,555 | 9/1932 | Simmons | 18—19 X |
| 2,804,644 | 9/1957 | Kyle | 18—19 X |
| 3,081,491 | 3/1963 | Black | 18—19 |
| 3,121,916 | 2/1964 | Edwards | 18—19 |
| 3,173,174 | 3/1965 | Edwards | 18—19 |
| 3,235,639 | 2/1966 | Knowles. | |
| 3,321,562 | 5/1967 | Wanderer | 18—19 XR |

FOREIGN PATENTS

| | | |
|---|---|---|
| 1,387,010 | 12/1964 | France. |

WILLIAM J. STEPHENSON, *Primary Examiner.*